(12) United States Patent
Schmidt et al.

(10) Patent No.: US 12,352,641 B2
(45) Date of Patent: Jul. 8, 2025

(54) STRAIN MEASUREMENT DEVICE AND OVERALL DEVICE WITH SUCH A STRAIN MEASUREMENT DEVICE

(71) Applicant: Balluff GmbH, Neuhausen a.d.F. (DE)

(72) Inventors: Manuela Schmidt, Filderstadt (DE); Jonas Holder, Dettingen (DE); Florian Liebgott, Stuttgart (DE); Albert Dorneich, Ostfildern (DE); Julian Fial, Tubingen (DE); Gunter Huebner, Seeheim-Jugenheim (DE); Aakash Grewal, Stuttgart (DE); Hubertus Breier, Gerstetten (DE)

(73) Assignee: BALLUFF GMBH, Neuhausen ADF (DE)

( * ) Notice: Subject to any disclaimer, the term of this patent is extended or adjusted under 35 U.S.C. 154(b) by 401 days.

(21) Appl. No.: 18/106,663

(22) Filed: Feb. 7, 2023

(65) Prior Publication Data
US 2023/0258513 A1    Aug. 17, 2023

(30) Foreign Application Priority Data
Feb. 11, 2022    (DE) .............................. 102022103290

(51) Int. Cl.
*G01L 1/22*    (2006.01)
*G01B 7/16*    (2006.01)

(52) U.S. Cl.
CPC .............. *G01L 1/2287* (2013.01); *G01B 7/20* (2013.01)

(58) Field of Classification Search
CPC ................................ G01L 1/2287; G01B 7/20
(Continued)

(56) References Cited

U.S. PATENT DOCUMENTS 4,481,497 A * 11/1984 Kurtz .................... G01L 9/0055
                                                     73/756
5,861,558 A *  1/1999 Buhl ..................... H01C 10/103
                                                     73/777
(Continued)

FOREIGN PATENT DOCUMENTS

DE        19747001 A1    5/1999
DE        10153208 A1    5/2003
(Continued)

OTHER PUBLICATIONS

Enser et al, "Printed strain gauges embedded in organic coatings—Analysis of gauge factor and temperature dependence", Sensors and Actuators A: Physical, , pp. 137-143, vol. 276, Publisher: ScienceDirect; 2018; ISSN 0924-4247.

*Primary Examiner* — Nathaniel T Woodward
(74) *Attorney, Agent, or Firm* — GableGotwals (57) ABSTRACT

A strain measurement device (10) for electrically determining a strain of a basic body, having a carrier film (12) which can be applied to the basic body (40), an electric measuring loop (14) printed onto the carrier film (12) of conductive printing paste/printing ink, which has a measuring element (16) for generating an electrical signal based on the strain and which has four conducting tracks (18) connected to the measuring element (16) for four-wire sensing, the four conducting tracks (18) each having an electrical conductor connection (22), the conducting tracks (18), the conductor connections (22) and the measuring element (16) being printed with the same printing paste. Furthermore, an overall device (38) with such a strain measurement device (10), the strain measurement device (10) being connected to a base unit (44) which has an evaluation unit (46) and an energy supply unit (48).

15 Claims, 8 Drawing Sheets

(58) Field of Classification Search
USPC .................................................. 73/862.627
See application file for complete search history.

(56) References Cited

U.S. PATENT DOCUMENTS

| | | | |
|---|---|---|---|
| 2004/0159162 A1* | 8/2004 | Kieffer | G01L 1/2287 |
| | | | 73/777 |
| 2019/0023929 A1* | 1/2019 | Lanceros Mendez | G01B 7/16 |
| 2023/0407112 A1* | 12/2023 | Mukaida | C09D 5/24 |

FOREIGN PATENT DOCUMENTS

| | | |
|---|---|---|
| DE | 60305326 T2 | 3/2007 |
| DE | 102019131849 B3 | 5/2021 |
| DE | 102020112982 A1 | 11/2021 |
| EP | 0451636 A1 | 10/1991 |

* cited by examiner

STRAIN MEASUREMENT DEVICE AND OVERALL DEVICE WITH SUCH A STRAIN MEASUREMENT DEVICE

CROSS-REFERENCE TO RELATED APPLICATIONS

This United States application claims priority to German Patent Application No. DE 10 2022 103 290.6 filed 11 Feb. 2022, which is incorporated herein by reference.

The present invention relates to a strain measurement device. The present invention also relates to an overall device with such a strain measurement device.

PRIOR ART

Strain measurement devices are used as sensors for the electric measurement of strain. For example, strain measuring strips are applied to bodies that are to be strained. The strain measuring strip is likewise expanded as a result of the strain of the body, thus altering the electrical resistance of the strain measuring strip. Strain measuring strips are usually used in the area of the elastic strain of bodies, so the strain measuring strip serves to monitor reversible deformations of a body. Such high-precision strain measuring strips are provided for strains of up to 5% and are often produced in a clean room, for example through sputtering. The accuracy required for the reversible measurement of elastic strain can be determined by a k factor which, as a proportionality factor, is connected as follows to the resistance R of the strain measuring strip and its change of resistance ΔR and its original length L compared to its change of length ΔL:

$$\frac{\Delta R}{R} = k \frac{\Delta L}{L}$$

The material stress can be calculated from the strain using strength of materials methods. Such strain occurs, for example, when a semi-finished product is being shaped.

A strain measuring strip is known from EP 0 451 636 A1. The strain measuring strip has a base layer onto which a strain-sensitive measuring grid is sputtered. The strain measuring strip has just two connections for an evaluation circuit, the connections being positioned on the base layer in the immediate vicinity of the measuring grid.

Another strain measuring strip is known from DE 603 05 326. The measuring strip contains a semi-rigid substrate onto which a strain-sensitive resistance film is adhered. The resistance film has a first and a second connection onto which lines are soldered. The connections are arranged in the immediate vicinity of the serpentine measurement section of the resistance film.

The strain measuring strips have just two connections by means of which the resistance measurement of the resistance film takes place. In resistance measurement with just two connections, the line and connection resistances are measured together, so the measured resistance does not reflect the actual resistance value of the resistance film. Owing to the distorted resistance value, an exact determination of the extent of the strain of the semi-finished product cannot easily be achieved.

The effective structural height of the strain measuring strip in the area of a measurement point is increased by the lines which have been soldered on in the immediate vicinity of the serpentine measurement section of the resistance film. This is particularly disruptive if the strain measuring strip is supposed to be used at a measurement point between two surfaces lying close together. For example, such a high-structured strain measuring strip is undesirable in a shaping process like the draping or deep drawing of semi-finished products since the shape of the shaping tool is supposed to be reproduced exactly therein. A high-structured strain measuring strip would affect the shape accorded to the semi-finished product and leave undesirable artefacts on the finished shape in the area of the measurement point on the semi-finished product.

The object of the invention is to provide a strain measurement device which is of low structural height and at the same time allows fault-free measurement of the actual strain, the strain measurement devices being intended to be less expensive than known strain measurement devices.

DISCLOSURE OF THE INVENTION

To solve the above object, it is proposed that a strain measurement device be provided for electrically determining a strain of a basic body, having a carrier film which can be applied to the basic body and having an electric measuring loop printed onto the carrier film of conductive printing ink or printing paste, which has a measuring element for generating an electrical signal based on the strain and which has four conducting tracks connected to the measuring element for four-wire sensing, these four conducting tracks each having an electrical conductor connection, the conducting tracks, the conductor connections and the measuring element being printed with the same printing paste.

Through the use of such a printing paste, inexpensive series production of the strain measurement device can be achieved since, in particular, no vacuum devices have to be kept available for a sputtering process. Inexpensive series production is achieved hereby, in particular, if the same printing paste is used for the measuring element, the conductor connections and the conducting tracks. In addition, it is also possible to achieve any desired size of measuring loop whose conducting tracks and conductor connections are not positioned in the immediate vicinity of the measuring element since the dimensions of the strain measurement device are not limited by the dimensions of a vacuum chamber of a vacuum device for a sputtering process.

A semi-finished product can be shaped from the basic body of a blank which is based, for example, on a carbon fibre fabric. Finished products can also be shaped from the basic body. In this case, the carbon fibre fabric is converted into a desired shape through draping. The carbon fibre fabric may expand by more than 30% in different directions here. This considerable strain which occurs during the process of transforming a blank into the semi-finished product can damage the carbon fibre fabric.

In the three-dimensional deformation of the blank, which is provided as a scrim or fabric, the distances between the fibres on which the basic body of the blank is based can be increased through shearing. In order to control and optimize the quality of the products and the frequency of rejects in production in the manufacturer's favour, the strain measurement devices according to the invention can be applied at measurement points which are subject to particularly large strain. Owing to the flat structure of the strain measurement device according to the invention, in-situ measurement can be carried out during the shaping of the semi-finished product. Owing to the inexpensive production process based on a method of printing the measuring loops, the strain measurement device can be used as a disposable sensor, so measurement can be carried out far into the area of the plastic deformation of the strain measurement device.

Four-wire sensing is used in the measurement of electrical resistances if there is a danger that line and connection resistances will distort the measurement. It is therefore advantageous if the electrical resistance of a measuring element of a strain measurement device is also determined by means of four-wire sensing. In four-wire sensing, a known electric current flows through the measuring element over two of the pathways. The voltage drop at the measuring element is sensed by the other two conducting tracks and measured with a voltmeter. The resistance to be measured is calculated therefrom according to Ohm's law.

The measuring element may have a meandering measuring conductor structure which is connected to the four conducting tracks.

Advantageous developments and configurations of the invention are contained in the sub-claims.

The carrier film advantageously has a polymer film. The polymer film preferably consists of polyester, polyethylene or thermoplastic polyurethane. The printing paste is typically what is referred to as a filled polymer which contains silver and/or conductive soot particles. Through the use of corresponding materials for the carrier film and the printing paste, high expandability along with thermal stability is guaranteed. In particular, such polymeric printing pastes can withstand strain of over 100% such that structures printed therefrom are still sufficiently conductive even after strain.

Provision is made for the carrier film to be configured such that the measuring element may be arranged on an area of the basic body to be deformed, the conductor connections being arranged outside the area to be deformed. For example, plugs, pins, crimp connections or soldering points which are applied to the conductor connections and are higher than the rest of the measuring loop may hereby be positioned outside the area of the basic body to be deformed. As a result, the artefacts generated by high-structured connection means are avoided in the area of the basic body to be deformed.

According to a particular embodiment, the measuring element is configured in the form of a strip, in each case two conducting tracks being arranged at a longitudinal end of the measuring element. The measuring element extends along a longitudinal axis. The preferred direction of measurement is easily provided by the longitudinal axis.

A conducting track preferably has a connection section on which a conductor connection is arranged. The conducting track also has an element section which is arranged between the measuring element and the connection section, the connection sections of the conducting tracks of a measuring element being arranged adjacent to one another and being aligned parallel to one another at least in sections. The conductor connections can hereby be visibly guided to a point outside the area to be deformed such that a shaping process concerning the basic body is not influenced by the conductor connections.

It is particularly preferred if a longitudinal axis of the measuring element is at an angle to the connection sections which is not 90°. The connection sections with the conductor connections may hereby be positioned comfortably outside the area to be deformed and at the same time any direction of strain can be metrologically sensed.

A particular configuration of the strain measurement device provides for a plurality of separate measuring loops which are each adapted to determine strain occurring in different directions. The plurality of measuring loops are arranged on a shared carrier film here. Three-dimensional shapes can hereby be monitored very simply in terms of their strain in different directions during the shaping process.

The three-dimensional monitoring of shaping can be carried out both particularly effectively and inexpensively through three measuring elements which are configured in a star shape with respect to one another, each of the measuring elements being assigned to a separate measuring loop. The directions of strain to be sensed are preferably at an angle of 120° to directions of strain of adjacent measuring elements. This is possible, in particular, with sensors which are sufficiently small or if the reshaping surface is large, as is the case in a sphere with constant reshaping.

To achieve the maximum functional integration into the strain measurement device, the measuring loop has a microprocessor arranged on the carrier film which is adapted to provide the electrical signal generated by the measuring element. Through the microprocessor, the signal from the measuring element can be converted into a resistance value which is taken up as an information signal to the conductor connections by a base unit which processes the information signal by means of an evaluation unit and displays it for a user such that the user can draw conclusions regarding the strain which has taken place during shaping.

To solve the object, it is also proposed that an overall device with the strain measurement device be provided, the strain measurement device being connected to a base unit which has an evaluation unit and an energy supply and communication unit. An overall device can hereby be produced which is suitable for series production. In particular, small series can be monitored by such an overall device in which adaptive shaping tools are used. These adaptive shaping tools are incorporated into a control circuit in which the overall device supplies a control variable determined by the strain measurement device by means of which the shaping process is regulated. For example, such adaptive shaping tools can be reconfigured by reference to the in-situ measurement while shaping is still being carried out in order to avoid damaging the basic body. The base unit may contain an IO-Link master. An IO-Link master is an automated communication system into which sensors and actuators are integrated. The system operates with standardized communication.

In order to enable a plurality of measuring loops to be evaluated and supplied by the overall device, it is advantageous if the evaluation unit has an amplifier stage and second and third multiplexers connected to the amplifier stage. Through the multiplexers, the electrical signals from different measuring loops can be forwarded to the amplifier stage one after the other or in groups in order to be amplified there for subsequent evaluation.

Provision is made for a radio device which is wirelessly connected to the evaluation unit to be connected to the measuring loops. The radio device is connected to the conductor connections arranged outside the area to be deformed. The radio transmission by the radio device to the evaluation unit may be carried out via Bluetooth, Wi-Fi, IO-Link Wireless, LTE, 5G, LoRa, ZigBee, WirelessHART or a specific proprietary radio transmission. The base unit has a corresponding reception unit here.

In order to guarantee secure but nevertheless decentralized energy supply to the strain measurement device and the radio device, an energy supply unit may be provided in the form of a battery in the radio device. The battery is preferably rechargeable.

In a preferred alternative, provision is made for the strain measurement device to have an RFID unit which is wirelessly connected to a read/write unit in the base unit for signal and energy transmission. The RFID unit may have a microprocessor and an energy store, the RFID unit not being of a height that would disrupt the shaping process or being positioned outside the basic body since the RFID unit is shielded from the metallic shaping tool during the draping process. Correspondingly, the energy store may be an accumulator and/or a capacitor based on thin film technology. The microprocessor may similarly be based on thin film technology.

Secure functioning of the switching device can be guaranteed if a sufficiently large amount of time for storing electrical energy in the strain measurement device is provided for between a first and a second measurement sequence of the read/write unit. The amount of time may be selected to be long enough here, for example, for a capacitor or an accumulator to be charged with the energy that is input into the strain measurement device through the radio radiation.

BRIEF DESCRIPTION OF THE DRAWINGS

Further details, features and advantages of the invention are set out in the following description and the graphic illustration of an exemplary embodiment.

In the drawings.

DESCRIPTION OF THE INVENTION

Figure 1:
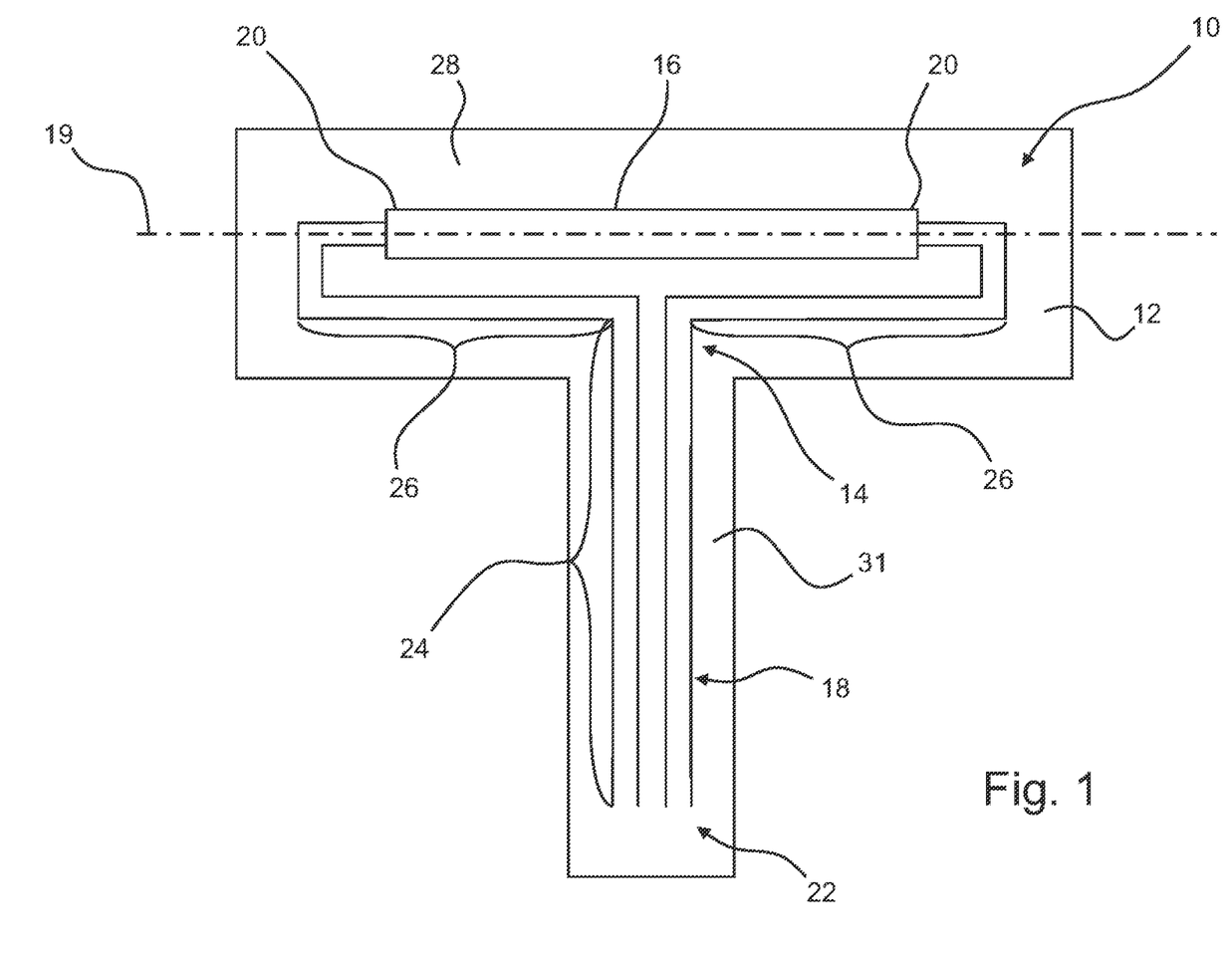
FIG. 1 shows a T-shaped strain measurement device for electrically determining a strain.

An exemplary embodiment of a strain measurement device 10 according to the invention is shown in FIG. 1. The strain measurement device 10 is provided for electrically determining a strain, a calibration curve which correlates the electrical resistance in Ohms to the strain in percent being used as a basis for determining the strain. Such strain occurs, for example, in the deformation of materials on which a semi-finished product is based.

The strain measurement device 10 according to FIG. 1 used as an example has a carrier film 12 which contains a polymer film. The carrier film 12 is configured to be flexible and no more than 100 micrometres thick. The carrier film 12 is very elastic here, so strain of over 100% of the original size of the carrier film 12 can be achieved without the carrier film 12 tearing as a result of the strain and excessive counterforces caused by the strain are not produced. The carrier film can be expanded approximately without additional application of force, so there are no appreciable effects of force on the strain of the basic body to be measured. For this purpose, the polymer film may consist of polyethylene, polyester or thermoplastic polyurethane.

A measuring loop 14 is printed onto the carrier film 12 by means of a conductive printing ink or printing paste. The printing paste is typically what is referred to as a filled polymer which contains silver and/or conductive soot particles. Such polymer pastes have high expandability along with thermal stability. In particular, such polymeric printing pastes can withstand strain of over 100% such that the measuring loop 14 printed with the aid of the printing paste is still sufficiently conductive during and after strain.

The measuring loop 14 has a measuring element 16 and four conducting tracks 18 which are electrically connected to the measuring element 16. The measuring element 16 is provided to measure the strain to be determined. For this purpose, the change of resistance of the measuring element 16 which is caused by a strain of the measuring element 16 is measured. The extent of the strain can be determined from the change of resistance via a calibration curve.

The measuring element 16 and the conducting tracks 18 are produced from the same printing paste and can be printed onto the carrier film 12 in a shared printing step preferably using the silk-screen method.

In order to achieve an undistorted measurement of the resistance of the measuring element 16, four-wire sensing is carried out by means of the four conducting tracks 18. During four-wire sensing, the electrical resistance of the measuring element 16 is measured without the influence of the line and connection resistances.

The measuring element 16 is configured in the form of a strip and has a longitudinal axis 19. In each case two of the four conducting tracks 18 are arranged at longitudinal ends 20 of the measuring element 16. At conducting track ends opposite the longitudinal ends 20, the conducting tracks 18 have conductor connections 22 which are provided for connecting the measuring loop 14 to an evaluation unit.

Each conducting track 18 has a connection section 24 on which a conductor connection 22 is arranged, and an element section 26 which is arranged between the measuring element 16 and the respective connection section 24. The connection sections 24 of the different conducting tracks 18 of a measuring loop 14 are, by way of example, aligned parallel to one another and at the same time arranged adjacent to one another. The conductor connections 22 are likewise arranged adjacent to one another.

The strain measurement device 10 from FIG. 1 used as an example is configured to be substantially T-shaped, the measuring loop 14 being applied to a carrier film 12 configured to be T-shaped. The element sections 26 are hereby configured to be parallel to the longitudinal axis 19 of the measuring element 16 and arranged on a first section 28 of the carrier film 12. Alternatively, the film 12 may also be a different shape. For example, a plurality of printed measuring loops 14 may be accommodated on the film 12 in order to determine the strain at a plurality of points. The connection sections 24 are aligned perpendicularly to the longitudinal axis 19 and arranged on a second section 31 of the carrier film 12 which is aligned perpendicularly to the first section 28 of the carrier film 12 and arranged centrally on one side of the first section 28.

Figure 2:
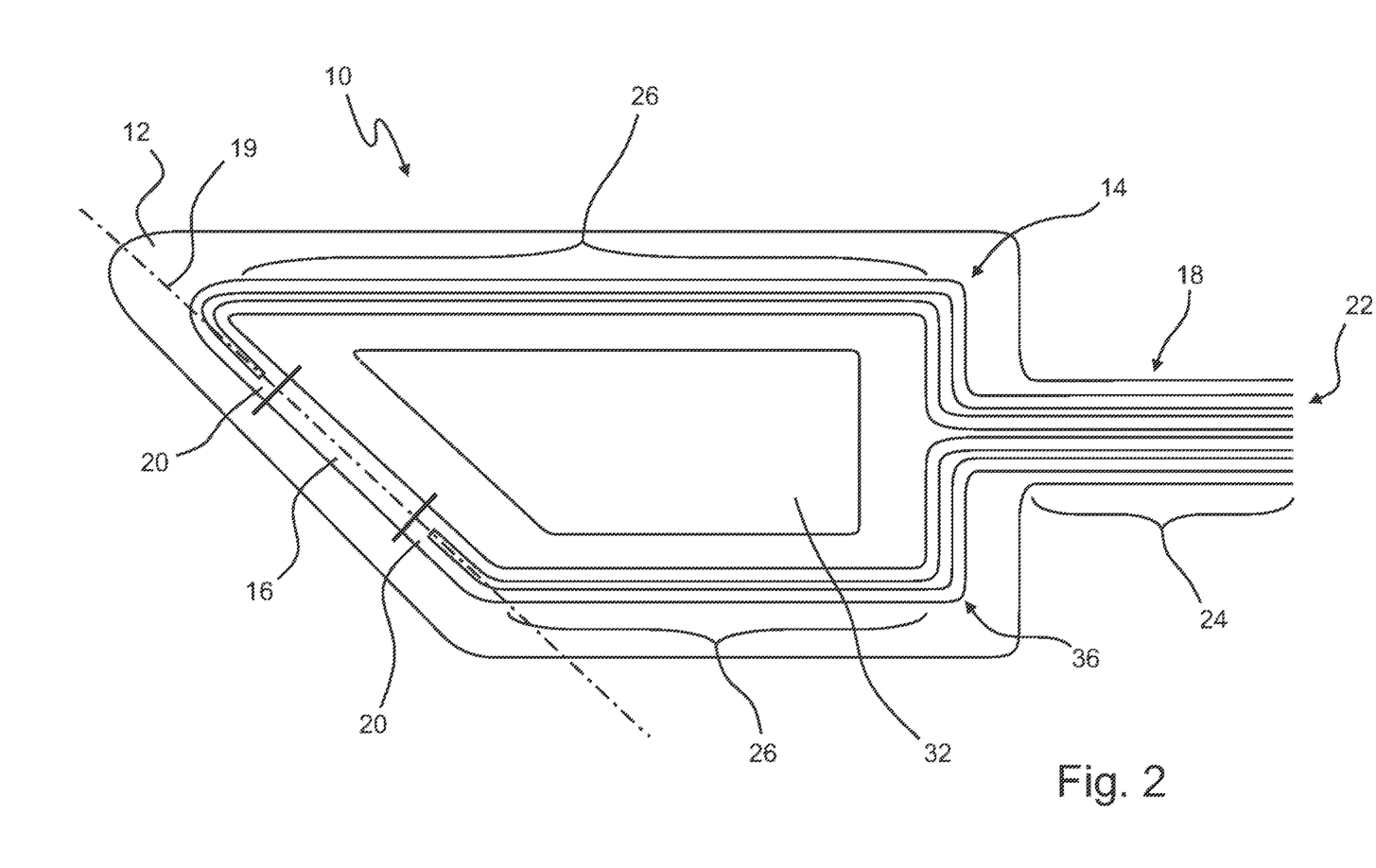
FIG. 2 shows an eye-shaped strain measurement device for electrically determining a strain.

FIG. 2 shows a further exemplary embodiment of a strain measurement device 10 which has a measuring loop 14, the measuring element 16 of which has a longitudinal axis 19 which is at an angle to the connection sections 24 which is not 90°. The longitudinal axis 19 may preferably be at an angle of 60° to the connection sections 24. The element sections 26 are also mostly parallel to the connection sections 24. The measuring element 16 and the element sections 26 form an eye-shaped section 36 of the measuring loop 14 which is arranged on a complementarily configured carrier film 12. The carrier film 12 has an opening 32 around which the measuring loop 14 runs. The measuring element 16 is arranged on a side of the opening 32 opposite the connection sections 24 along the carrier film 12. The element sections 26 of the different longitudinal ends 20 of the measuring element 16 also lie on further opposite sides of the opening 32 along the carrier film 12. Alternatively, the carrier film 12 may be made without an opening 32.

Figure 3:
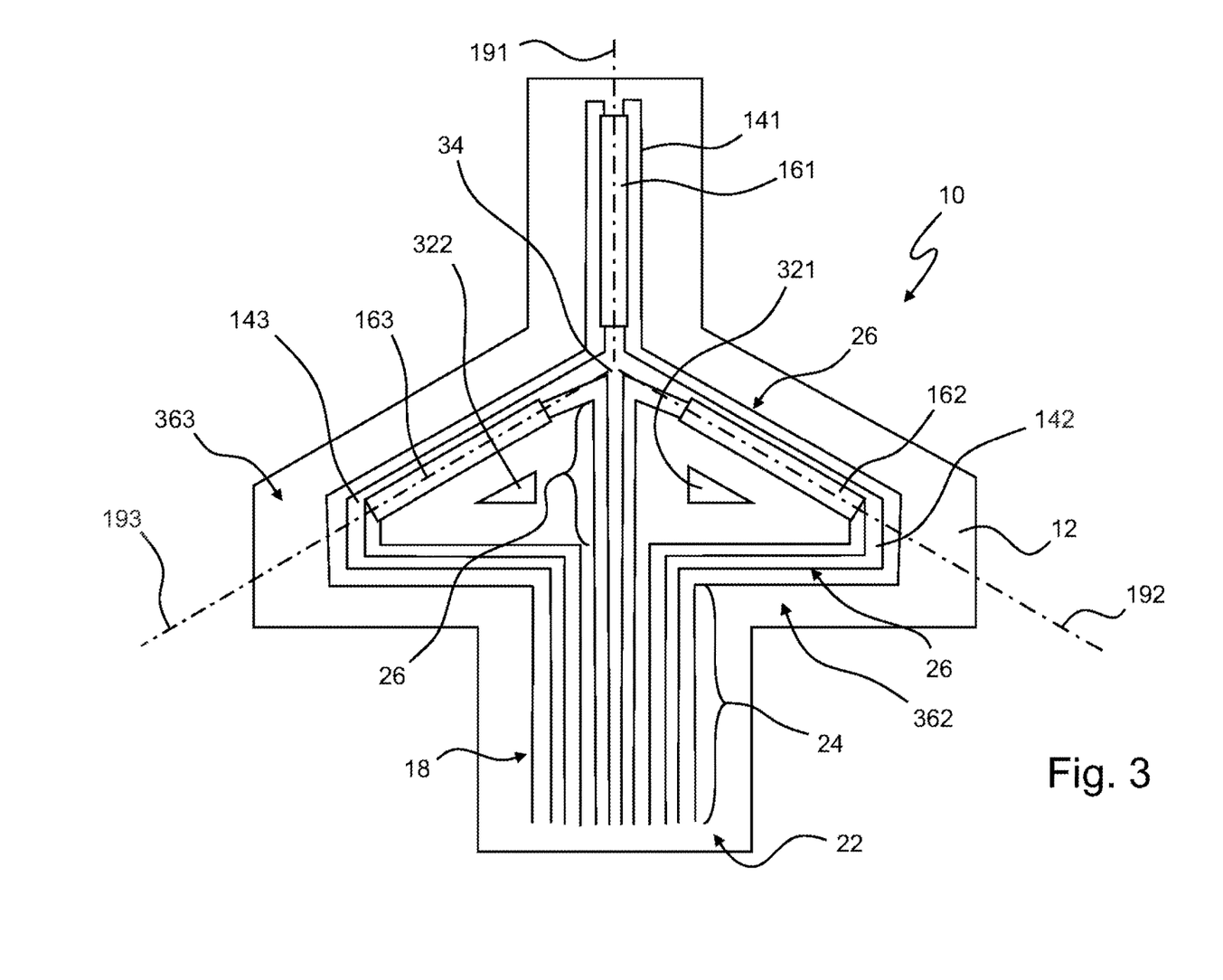
FIG. 3 shows a star-shaped strain measurement device for electrically determining a strain.

A further exemplary embodiment, shown in FIG. 3, contains a strain measurement device 10 which has a plurality of separate measuring loops 141, 142, 143 which are each adapted to determine strain occurring in different directions. The plurality of measuring loops 141, 142, 143 are arranged on a shared carrier film 12 here.

According to the exemplary embodiment, a first measuring loop 141 is provided with a first measuring element 161, a second measuring loop 142 with a second measuring element 162 and a third measuring loop 143 with a third measuring element 163. The three measuring elements 161, 162, 163 are each provided to measure a direction in space of three-dimensional strain during the shaping process. The reshaping of the approximately two-dimensional blank into the three-dimensional semi-finished product and the strain occurring here can hereby be monitored.

The three measuring elements 161, 162, 163 are arranged, for example, in a star-shaped arrangement on the carrier film 12. The longitudinal axes 191, 192, 193 of the measuring elements 161, 162, 163 are aligned with one another such that a first longitudinal axis 191 is in each case at an angle of 120° to a second and a third longitudinal axis 192, 193, the longitudinal axes 191, 192, 193 intersecting all three measuring elements 161, 162, 163 at a central point 34. Accordingly, the strain directions sensed by the three measuring elements 161, 162, 163 are each offset from one another by an angle of preferably 120°.

The connection sections 24 of the conducting tracks 18 of the measuring loops 141, 142, 143 are aligned parallel to one another and adjacent to one another. Some of the element sections 26 of different measuring loops 141, 142, 143 are also configured in parallel.

The connection sections 24 of the conducting tracks 18 of the second and third measuring elements 162, 163, which start from longitudinal ends 20 of the measuring elements 162, 163 facing towards the central point 34, run between the measuring elements 162, 163. The element sections 26 of the conducting tracks 18 of the second and third measuring elements 162, 163, which start from longitudinal ends 20 of the measuring elements 162, 163 facing away from the central point 34, are aligned perpendicularly to the connection sections 24. An eye-shaped section 362 of the second measuring loop 142 and an eye-shaped section 363 of the third measuring loop 143 which is substantially triangular in shape may hereby be generated.

Purely as an example, a first opening 321 in the carrier film 12 which preferably reproduces the course of the eye-shaped section 362 of the second measuring loop 142 is configured between the second measuring element 162 and the associated element sections 26 of the conducting tracks 18. Also purely as an example, a second opening 322 which likewise substantially reproduces the shape of the eye-shaped section 363 of the third measuring loop 143 is configured between the third measuring element and the associated element sections 26.

The whole strain measurement device 10 in FIG. 3 is designed to be arrow-shaped, the strain measurement device 10 being configured to be symmetrical with respect to the first longitudinal axis 191. The measuring elements 16 are arranged to be star-shaped here.

The conducting tracks 18 of the exemplary embodiments in FIGS. 1 to 3 do not cross.

Figure 4:
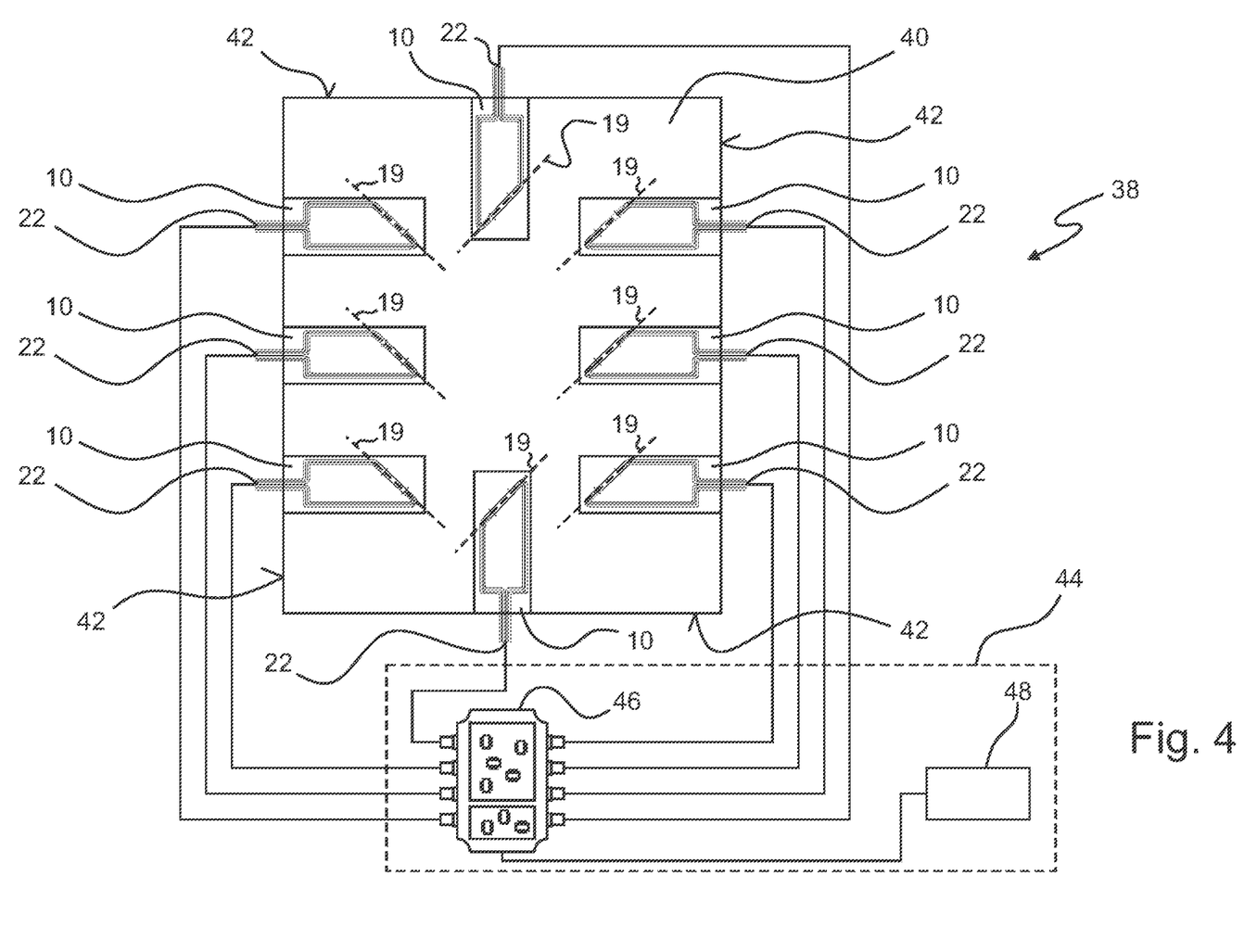
FIG. 4 shows an overall device with strain measurement devices connected to a base unit on a basic body.

FIG. 4 shows an overall device 38 with which strain measurement devices 10 can be evaluated. At the same time, a purely exemplary arrangement of preferably eight strain measurement devices 10 is shown on a basic body 40 of a blank which may be deformed during the shaping of the semi-finished product. Strain of over 30% may occur during the deformation of the basic body 40. For this purpose, the strain measurement devices 10 in FIG. 2 are arranged on a square basic body 40 such that the in each case four conductor connections 22 are arranged at the edges 42 of the basic body 40 and the respective longitudinal axes 19 of the measuring elements 16 are not at an angle of, purely as an example, 90° to the edges 42. The conductor connections 22 are positioned outside the area of the basic body 40 to be deformed such that, at the conductor connections 22, connection means like plugs, pins, crimp elements or soldering points, which are raised above the respective structural height of the rest of the strain measurement device 10, can be brought to an end without impairing the shaping process.

The strain measurement devices 10 are connected to a base unit 44 which has an evaluation unit 46 and an energy supply unit 48. The connection between the strain measurement devices 10 and the base unit 44 is produced by connecting cables in the exemplary embodiment in FIG. 4. The evaluation unit 46 evaluates the electrical signals provided at the conductor connections 22 by the measuring loops 14. The signals received in this way from the measuring loops 14 are hereby provided such that conclusions may be drawn regarding the strain that has occurred during the shaping of the semi-finished product from the basic body 40.

The base unit 44 may contain an IO-Link master which, for example, serves as an energy supply and communication unit 48 and also provides communication with a central control unit which is not shown.

Figure 5:
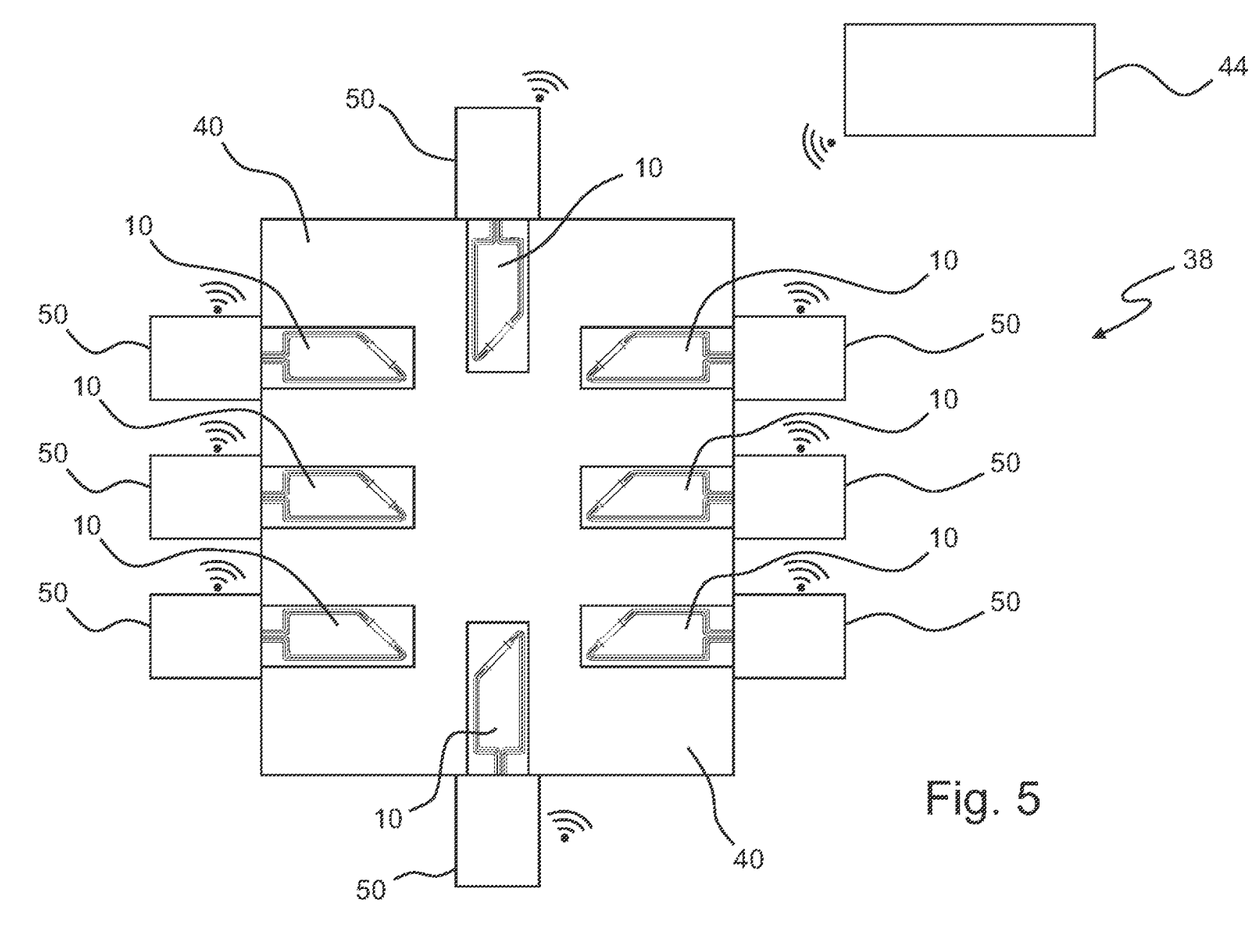
FIG. 5 shows an overall device with strain measurement devices having radio devices on a basic body.

A further exemplary embodiment of the overall device 38 is shown in FIG. 5. Provision is made here for each strain measurement device 10 to have a radio device 50. The radio devices 50 are wirelessly connected to the base unit 44. The radio devices 50 are connected to the conductor connections 22 arranged outside the area of the basic body 40 to be deformed. The radio devices 50 may be detachably connected to the conductor connections 22. Each radio device 50 is also equipped with an energy supply unit in the form of a battery which is preferably rechargeable. The radio device 50 provides a constant current for the four-wire sensing and measures the voltage in order to transmit the information to the evaluation unit.

The radio transmission from the radio device 50 to the base unit 44 is carried out, for example, through a radio protocol standard by Wi-Fi, IO-Link Wireless, LTE, 5G, LoRa, ZigBee, Bluetooth, WirelessHART or according to a specific proprietary radio transmission protocol. The base unit 44 has a corresponding reception unit here.

Figure 6:
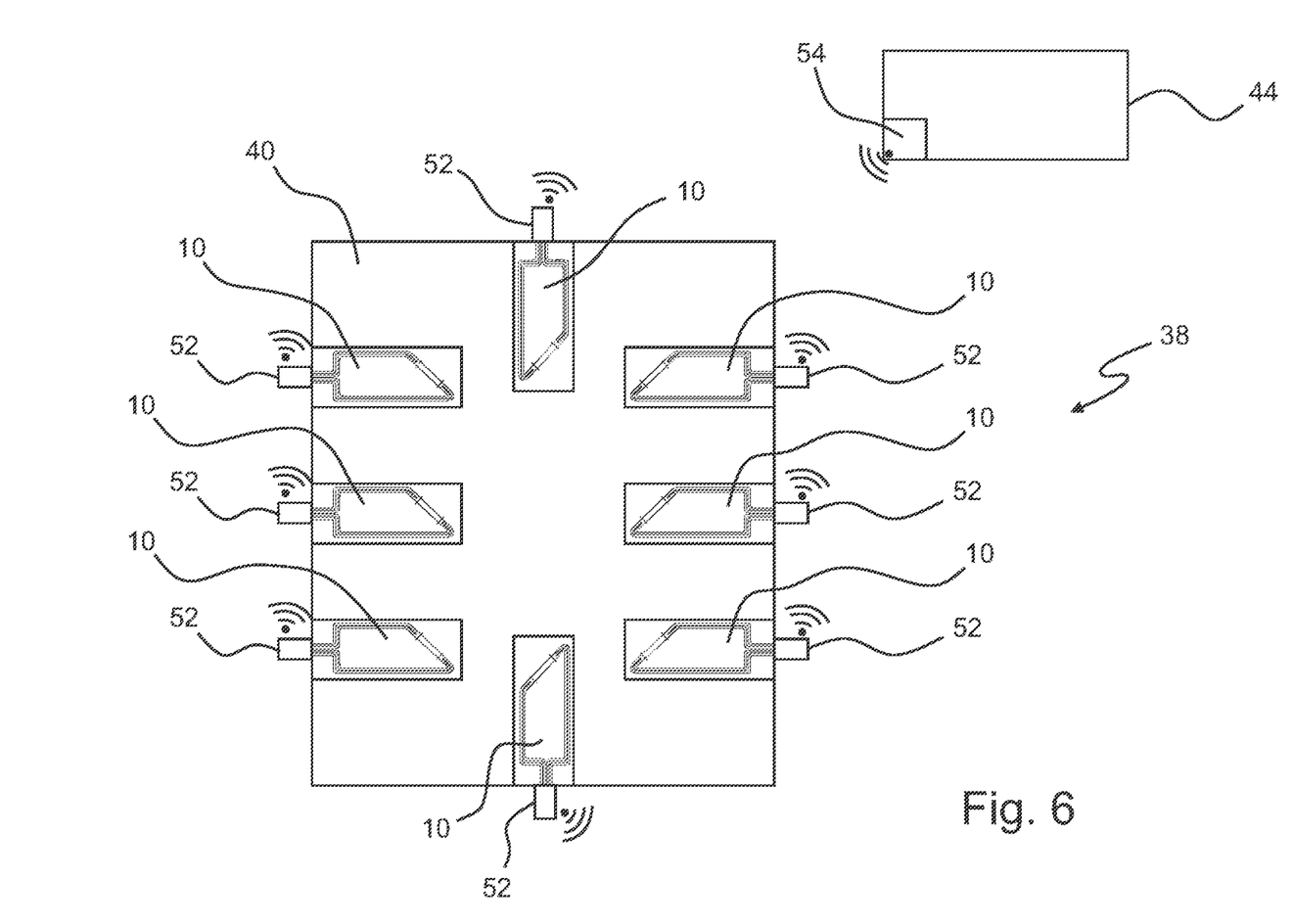
FIG. 6 shows an overall device with strain measurement devices having RFID units on a basic body.

According to the exemplary embodiment in FIG. 6, the basic body 40 has a plurality of strain measurement devices 10 which are equipped with RFID units 52. The RFID units 52 are preferably positioned outside the basic body 40 since they are other electromagnetically shielded from the metallic shaping tool during the draping process. The RFID (Radio-Frequency identification) units 52 are wirelessly connected by means of a read/write unit 54 in the base unit 44 for signal and energy transmission. For this purpose, each RFID unit 52 is equipped with an antenna, a microprocessor, an energy management system and an energy store. The microprocessor may serve to convert the electrical signal from the measuring element into an RFID-capable data stream which can be received by the read/write unit 54. The data stream is hereby sent on the basis of a radio protocol with a frequency in the UHF range between 860 and 960 MHz. The energy store may be an accumulator and/or a capacitor based on thin film technology.

An amount of time is hereby provided for between a first and a second measurement sequence of the read/write unit 54 which is sufficient to store enough electrical energy for the functioning of the RFID unit 52. The energy is fed into the strain measurement device 10 through the read/write unit 54 in the form of radio radiation and can be stored by the capacitor and/or the accumulator in the period between two measurement sequences. There is therefore no need to replace or recharge the accumulator through a wired charging device.

Figure 7:
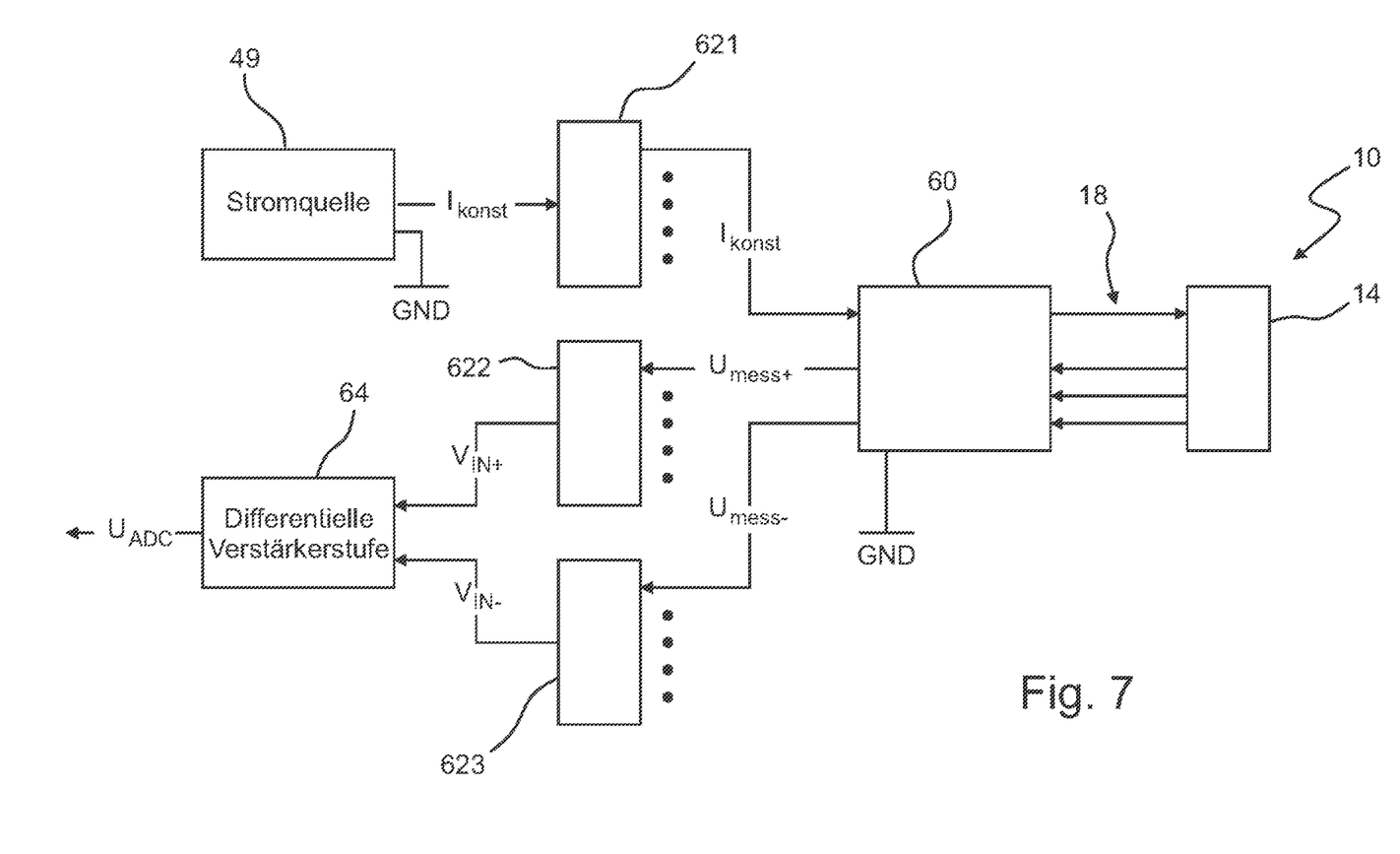
FIG. 7 shows a diagram of a circuit logic of an overall device.

FIG. 7 shows an exemplary diagram of a circuit logic of an overall device 39. The circuit logic may be applied to the overall devices 38 in FIGS. 4 to 6.

The strain measurement device 10 is connected to an interface element 60 by means of four conducting tracks 18. The interface element 60 may be part of the base unit 44 or configured as an RFID unit 52. The interface element 60 may also be a sensor cable or a plug-in connector. The interface element 60 has the four conductor connections 22.

For four-wire sensing, two conducting tracks 18 are used to imprint a constant current from a current source 49 into the measuring loop 14, and two further conducting tracks 18 are used to measure the voltage drop produced as a result of the constant current at the measuring element 16 of the measuring loop 14 unburdened by line resistance.

The interface element 60 is also connected to three multiplexers 621, 622, 623 which enable a plurality of measuring loops 14 to be connected to a base unit 44. The first multiplexer 621 serves to allocate the current source 49 to the individual measuring loops 14 preferably in series. A constant current which is imprinted into the respective measuring loop 14 via two of the conducting tracks 18 is hereby allocated to the individual measuring loops 14.

The second and the third multiplexers 622, 623 serve to connect a preferably differential amplifier stage 64 to the two further conducting tracks 16 provided for voltage measurement. Corresponding to the first multiplexer 621, the second and the third multiplexers 622, 623 are hereby set such that the same measuring loop 14 is evaluated by four-wire sensing.

Figure 8:
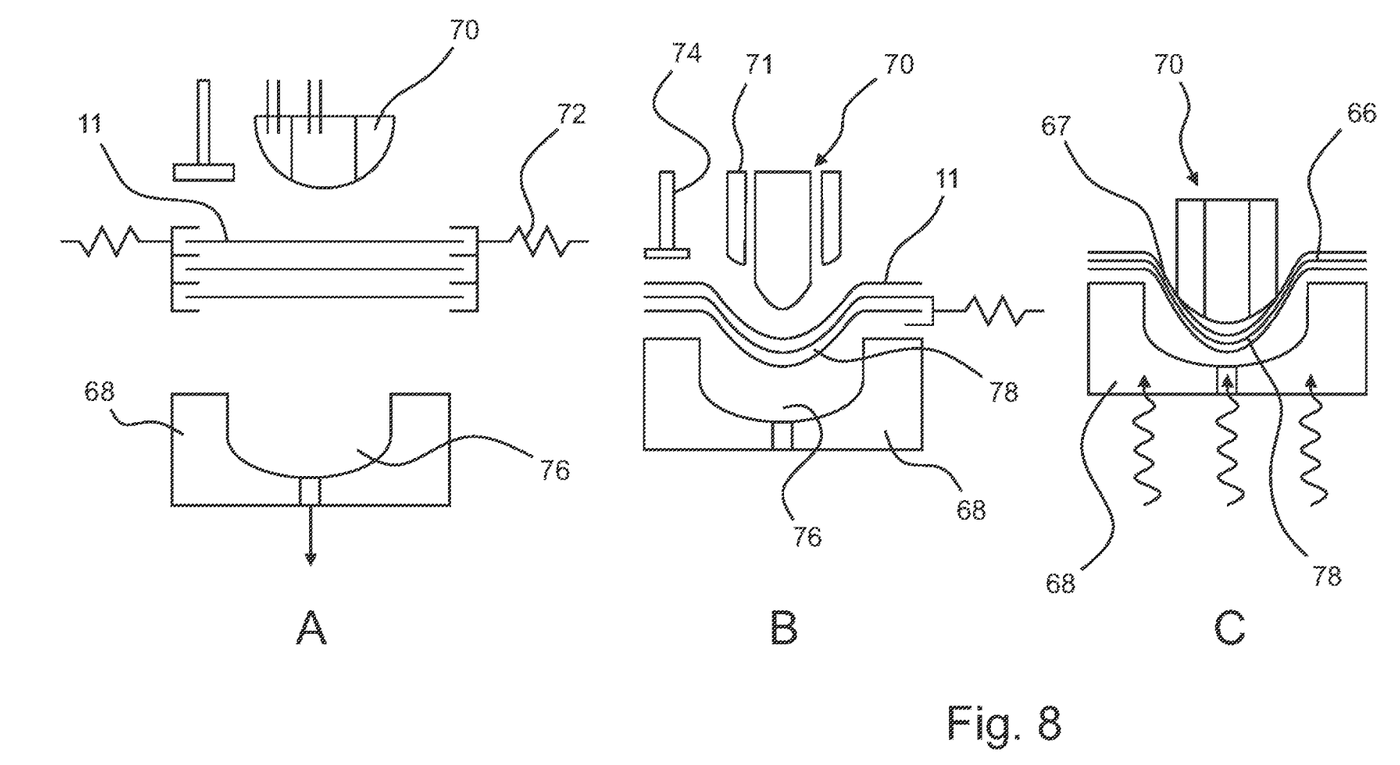
FIG. 8 shows a method sequence for the production of a semi-finished product, the method sequence being monitored by means of strain measurement devices.

FIG. 8 shows a shaping process for producing a semi-finished product 67 from a basic body 40. The basic body 40 may be applied with the strain measurement devices 10 from FIGS. 1 to 3, it being possible to use a switching device from FIGS. 4 to 6.

FIG. 8A shows a mould die 68 and an adaptive shaping tool 70 between which a multi-layered basic body 40 is positioned by a positioning unit 72. The basic body 40 may consist of a carbon fibre fabric.

According to FIG. 8B, the adaptive shaping tool 70 is moved towards the basic body 40. The adaptive shaping tool 70 has tool elements 71 which can be controlled separately from one another and can be lowered different distances towards the mould die 68. Purely as an example, the shaping tool 70 is configured in three parts. At the same time, a downholder 74 is pressed onto a part of the basic body 40 not arranged within an inwardly shaped profile section 76 of the mould die 68 such that the section of the basic body 40 outside the profile section 76 does not rise from the mould die 68 lying underneath it while the shaping tool 70 presses the area 78 of the basic body 40 to be deformed into the profile section 76.

FIG. 8C shows a step of the shaping process before the semi-finished product 67 is removed from the mould die 68. While the adaptive shaping tool 70 is still pressing the semi-finished product 67 firmly into the profile section 76, a heat treatment step is carried out in which the different layers of the original basic body 40 are connected to one another.

Series production can hereby be carried out for small series, the shaping process being monitored by the overall device 38. The adaptive shaping tool 70 is incorporated into a control circuit in which the overall device 38 supplies a control variable determined by the strain measurement devices 10 applied to the basic body 40. The control variable may be used to regulate the pressure forces of individual tool elements 71, the force for an individual tool element 71 being measured by a strain measurement device 10 at a measurement point in the area of the pressure point at which the individual tool element 71 presses onto the basic body 40 during the shaping process.

In principle, all of the abovementioned features relating to strain measurement devices 10 and the overall device can be combined with one another.

The invention claimed is:

1. Strain measurement device for electrically determining a strain of a basic body, said device comprising:
    a carrier film which can be applied to the basic body,
    an electric measuring loop printed onto the carrier film of conductive printing paste, which has a measuring element for generating an electrical signal based on the strain and which has four conducting tracks connected to the measuring element for four-wire sensing, each of the four conducting tracks having an electrical conductor connection, and
    wherein the conducting tracks, the conductor connections and the measuring element are printed with the same printing paste.

2. The strain measurement device according to claim 1, wherein the printing paste is a filled polymer which contains silver and/or conductive soot particles, and the carrier film is a polymer film.

3. The strain measurement device according to claim 1, wherein the carrier film is configured such that the measuring element can be arranged in an area of the basic body to be deformed and the conductor connections can be arranged outside the area to be deformed.

4. The strain measurement device according to claim 1, wherein the measuring element is configured in the form of a strip, in each case two conducting tracks being arranged at a longitudinal end of the measuring element.

5. The strain measurement device according to claim 1, wherein each conducting track has a connection section with a conductor connection arranged thereon and an element section which is arranged between the measuring element and the connection section, the connection sections of the conducting tracks of a measuring element being arranged adjacent to one another and being aligned parallel to one another at least in sections.

6. The strain measurement device according to claim 5, wherein a longitudinal axis of the measuring element is at an angle to the connection sections which is not 90°.

7. The strain measurement device according to claim 6, wherein at least three measuring elements which are configured in a star shape with respect to one another, each of the measuring elements being assigned to a separate measuring loop.

8. The strain measurement device according to claim 1, wherein a plurality of separate measuring loops on a carrier film which are in each case adapted to determine strain occurring in different directions.

9. The strain measurement device according to claim 1, wherein the measuring loop has a microprocessor arranged on the carrier film which is adapted to provide the electrical signal generated by the measuring element.

10. Overall device, the overall device comprising:
   a strain measurement device comprising a carrier film applied to a basic body, an electric measuring loop printed onto the carrier film with conductive printing paste, which has a measuring element for generating an electrical signal based on a strain and which has four conducting tracks connected to the measuring element for four-wire sensing, each of the four conducting tracks having an electrical conductor connection, and the conducting tracks, the conductor connections and the measuring element being printed with the same printing paste,
   wherein the strain measurement device is connected to a base unit which has an evaluation unit and an energy supply unit and communication unit.

11. The overall device according to claim 10, wherein the evaluation unit has an amplifier stage and a first multiplexer connected to the amplifier stage which is provided to forward the electrical signals from different measuring loops to the amplifier stage.

12. The overall device according to claim 10, wherein a radio device which is wirelessly connected to the evaluation unit is connected to the measuring loop.

13. The overall device according to claim 12, wherein the radio device has the energy supply unit in the form of a battery.

14. The overall device according to claim 10, wherein the strain measurement device has an RFID unit which is wirelessly connected to a read/write unit in the base unit for signal and energy transmission.

15. The overall device according to claim 14, wherein a sufficient amount of time for storing electrical energy in the strain measurement device is provided for between a first and a second measurement sequence of the read/write unit.

* * * * *